United States Patent [19]

Lee et al.

[11] Patent Number: 4,539,875
[45] Date of Patent: Sep. 10, 1985

[54] HIGH-SPEED METAL CUTTING METHOD AND SELF-SHARPENING TOOL CONSTRUCTIONS AND ARRANGEMENTS IMPLEMENTING SAME

[75] Inventors: Minyoung Lee; William R. Reed, Jr., both of Schenectady; Lawrence E. Szala, Scotia, all of N.Y.

[73] Assignee: General Electric Company, Schenectady, N.Y.

[21] Appl. No.: 331,341

[22] Filed: Dec. 16, 1981

Related U.S. Application Data

[63] Continuation-in-part of Ser. No. 221,078, Dec. 29, 1980, abandoned.

[51] Int. Cl.³ .............................. B23B 1/00; B26D 1/00
[52] U.S. Cl. ...................................... 82/1 C; 407/113; 407/119; 407/120; 409/66; 76/101 R
[58] Field of Search ............... 82/1 C, 36 R; 407/2–6, 407/100, 113–115, 118–120; 408/144, 145; 409/66; 76/101 R, 101 A; 75/240, 241, 242; 428/571, 600

[56] References Cited

U.S. PATENT DOCUMENTS

| 1,769,222 | 7/1930 | Ignatieff | 407/119 |
| 2,233,724 | 3/1941 | Bannister et al. | 29/103 |
| 3,188,717 | 6/1965 | Heinlein | 407/114 |
| 3,341,920 | 9/1967 | Kelm | 407/113 |
| 3,343,431 | 9/1967 | Boyer | 407/113 |
| 3,369,283 | 2/1968 | Colding | 407/113 |
| 3,416,209 | 12/1968 | Contrucci et al. | 407/113 |
| 3,564,683 | 2/1971 | Schedler et al. | 407/119 |
| 3,618,654 | 11/1971 | Meserve | 407/120 |
| 3,745,623 | 7/1973 | Wentorf, Jr. et al. | 76/101 A |
| 4,294,566 | 10/1981 | Boone | 407/114 |

FOREIGN PATENT DOCUMENTS

| 877531 | 5/1953 | Fed. Rep. of Germany | 407/118 |
| 197707 | 7/1977 | U.S.S.R. | 407/120 |
| 709258 | 1/1980 | U.S.S.R. | |

OTHER PUBLICATIONS

"The Wear of Forming Tools with a Shortened Back Surface During the Transverse Grinding of Spherical Races", by Gritsayenko et al., [Vestnik Mashinostroyeniya, 1979, No. 5, pp. 54–55]; English language translation enclosed.
"Modified Geometry Prolongs Tool Life", reported by Dr. M. Barash, [Manufacturing Engineering, Mar. 1980, p. 53].
"Innovative Tool Evaluation", by M. Lee, [DARPA/AFWAL/GE Advanced Machining Research Program–A report of work sponsored by the U.S. Government under Air Force Contract No. F33615-79-C-5119 presented at the General Electric Corporate Research & Development Center, Schenectady, N.Y., Jul. 15-16, 1980].
"Heat Build-Up on the Wearing Surfaces of Cutting Tools", by Y. A. Gritsaenko, [Vestnik mashinostroyeniya, 1963, No. 11, pp. 59–62]; English language translation enclosed.
"Instruments with Shortened Surfaces", by Y. A. Gritsaenko, [Transaction of the I. M. Gubkin Moscow Institution of the Petro Chemical & Gas Industry, No. 34, 1961, pp. 120–127], English language translation enclosed.

Primary Examiner—Leonidas Vlachos
Attorney, Agent, or Firm—Leo I. MaLossi; James C. Davis, Jr.; James Magee, Jr.

[57] ABSTRACT

A self-sharpening refractory metal cutting tool presenting an overhanging cutting portion, i.e. a flange, or ledge, of width equal to (or slightly greater than) the depth of the cut to be taken and maximum thickness equal to tolerable tool flank wear is disclosed. This tool construction has special utility in a novel high-speed cutting method in which only the tool flange does the cutting in which operation the flange is worn away with the wear progressing lengthwise of the flange during which time the flange sequentially performs a roughing cut and then a finishing cut in a single pass.

31 Claims, 9 Drawing Figures

HIGH-SPEED METAL CUTTING METHOD AND SELF-SHARPENING TOOL CONSTRUCTIONS AND ARRANGEMENTS IMPLEMENTING SAME

The invention disclosed and claimed therein was made in the performance of work sponsored by the U.S. Government under Air Force Contract F33615-79-C-5119.

This is a continuation-in-part of U.S. patent application Ser. No. 221,078, filed Dec. 29, 1980 and now abandoned.

The present invention relates generally to cutting tools and is more particularly concerned with novel constructions and arrangements for tools of refractory material, which are self-sharpening and have special utility in the machining of hard metallic articles, and is likewise concerned with a new high-speed cutting method based upon the use of these novel tool constructions and arrangements.

"Self-sharpening" as the term is used in this specification and the appended claims means and refers to the unique characteristic of retention of cutting ability of the cutting element of the tool as it is consumed during the cutting operation. Thus, unlike heretofore conventional milling and turning cutters, the self-sharpening tool constructions and arrangements of this invention do not require regrinding to sharpen them so that catastrophic escalation of the cutting force does not occur as workpiece material removal proceeds.

The terms "integral" and "integrally-formed" as used for certain of the tool constructions disclosed herein and in the appended claims mean and refer to a unitary body providing both the cutting and support functions as distinguished from a composite of articles separately formed to independently carry out these functions and thereafter temporarily or permanently joined, bonded or otherwise secured together to carry on a machining operation.

BACKGROUND OF THE INVENTION

High-speed machining, which is the method generally employed in shaping articles of metallic materials such as aircraft engine hot stage components, results in very rapid tool wear. Consequently, milling and turning operations involved in large-scale production must frequently be interrupted for regrinding or replacing of the cutting tools. This situation, which has long been widely recognized as a significant problem, has resulted in advances in tool design and the development of more wear-resistant tool fabrication materials, but not to the point that such tools can be used continuously until their cutting portions are completely worn away.

SUMMARY OF THE INVENTION

This invention, based upon our discoveries and new concepts set forth below, solves this problem by providing cutting tool constructions and arrangements, which require neither regrinding nor premature replacement because of the self-sharpening feature, which prevails as long as any of the particularly defined cutting portion remains. Further, this new result does not depend upon or require any new or different material. Thus, for example, any cemented carbide suitable for cutting tool fabrication, such as cobalt-bonded tungsten carbide, is readily usable in accordance with this invention to provide these new tool constructions and arrangements, which can advantageously be used in the novel high-speed machining method of this invention. Still further, new results and advantages of this invention are not offset to substantial extent or degree by any cost penalty or production or use complication in any application of cutting tools, including those applications involving the high-speed material removal operations carried out on difficult-to-machine alloy materials, such as so-called 6-4 titanium alloy (titanium containing six percent aluminum and four percent vanadium) in heat-treated condition and so-called 6-2-4-2 titanium alloy (titanium containing six percent aluminum, two percent tin, four percent zirconium and two percent molybdenum in forged condition.

The self-sharpening feature of the tool constructions and arrangements of this invention derives from our basic concept of controlling the tool wear process instead of merely delaying it, with the result that tools can be used continuously until most of the cutting portions thereof are consumed in a machining process of much improved efficiency. Such wear control is achieved using heretofore conventional tool fabrication materials as a result of our discovery that a ledge, or a flange, of suitable dimensions presented as an overhanging wearable portion (i.e. the cutting element) of a tool body will perform the desired cutting or material removing function just as well at the end as at the beginning of cutting element life, if the tool is moved relative to the workpiece so that wear of the cutting element is made to occur lengthwise thereof. In other words, we have found that a very long cut of high precision can be made through most of its length by using a ledge, or flange, of uniform cross-sectional size and shape as a consumable overhanging tool portion with the workpiece seeing the same sort of cutting edge in each successive longitudinal segment of the ledge encountered in the wearing process of the cutting operation.

A unique feature of the tool constructions and arrangements of this invention, when used according to the method of this invention (at least in the machining of titanium and titanium alloys), is that when breakage limited to the ledge occurs during the machining it merely generates a new sharp edge for continuation of the machining. Even minor breakage in conventional tools can have catastrophic consequences, especially in milling and in the machining operation in which the tool is "nosed" into the workpiece.

The predimensioned overhanging consumable ledge, or flange, will project to dispose its flank face at a distance in the range of from 20 mils to 80 mils (preferably from 30 mils to 50 mils) from the support face and will have a thickness providing a maximum flank dimension in the range of from 20 mils to 80 mils (preferably from 30 mils to 50 mils). The selection of the particular dimensions for the overhanging consumable portion (i.e. the cutting element) will depend upon the strength of the material of which the flange is made, the cut to be made, etc. However, as a practical matter, the longitudinal length of the cutting element should be at least ¼ inch long.

We have found in addition that this self-sharpening cutting action can be consistently obtained in high-speed cutting of metallic articles of widely different hardnesses, the important condition being the position of the overhanging consumable portion of the tool relative to the workpiece and the movement thereof relative to the workpiece. Thus, initially the tool must be brought into contact with the workpiece so that the cutting element, i.e. consumable ledge or flange, of the tool, bears upon the workpiece at the point where machining is to be begun so that the edge of the ledge is at an angle of about 1° to the plane of the finished cut surface, whether turning or milling. In a turning operation as the workpiece is continuously advanced and the tool is moved along the workpiece, the cut is made with one end of the ledge buried in the workpiece to provide the cutting edge. The workpiece material is removed either to the full extent desired or as long as the ledge is available for consumption, the wear occurring in a direction longitudinally of the ledge. In this cutting process as the tool advances and the lengthwise consumption of the ledge occurs, first a roughing cut is made on the workpiece and next, this roughly cut surface receives a finishing cut. This finishing cut is made by a very short length of the original sharp edge along the top of the flank face of the cutting element. This "short length" is not a stationary segment, but is a "moving" segment in that new short lengths of this original sharp edge continue to be brought into contact with the workpiece as the cutting element is consumed along its length. This dual cutting sequence is, therefore, the equivalent of the performance of two conventional tools. Further, in specific terms, we have established that in cutting certain difficult-to-machine titanium alloy bodies, the cutting can be made at rates as high as about 1100 feet per minute with the new tool constructions and arrangements of this invention employing ledge sizes ranging from 0.030 inch to 0.050 inch thickness and depth, and with the feed being 0.009 inch per revolution in each case.

According to another new concept of ours, tools of this invention, when integrally-formed, may be tailored as to physical properties so that the cutting element ledges, or flanges, have requisite characteristics for sustained good cutting action, while the greater part (i.e. the support portion) of such integral tool bodies consists of less expensive, somewhat softer but adequately strong material. Thus, for example, in the case of an integral cemented tungsten carbide tool, the support portion of the body of such a tailored version may consist essentially of iron-bonded tungsten carbide while the integrally-formed cutting element may consist essentially of cobalt-bonded tungsten carbide. Fabrication of these new tailored tool configurations may conveniently be accomplished by using two different tungsten carbide powder compositions and laying them in place for consolidation as an integral cemented tungsten carbide cutting tool.

Briefly described, in one embodiment of the self-sharpening consumable cutting tool of this invention, the tool construction comprises a body having a substantially planar surface portion constituting a supporting face disposed substantially normal to the rake face and an integrally-formed ledge, or flange, projecting substantially uniformly from and extending along at least a major portion of the length of the supporting face to predetermine the operative flank wear of the tool and, as well, the depth of cut as the ledge is consumed. Further, the ledge or flange which constitutes the consumable cutting portion of this tool is of substantially uniform cross-sectional shape and size (e.g. of rectangular shape) throughout its length. Still further, in general, it will be understood that this new self-sharpening integral tool of whatever refractory or other material it may be made, is producible either directly in its ultimate shape as by casting and then sintering or indirectly by producing first an oversized tool blank and then carrying out a shaping operation in which the tool blank is cut or trimmed to provide the requisite overhanging consumable cutting element projecting from the support face. Preferably this ledge, or flange, will be wider by one or two thousandths inch than the depth of the intended cut to be made through the use of the tool in a machining operation involving turning or milling action. Further, the ledge will have a maximum thickness corresponding to the ultimate flank wear dimension to be tolerated during the machining operation.

In a second embodiment of the self-sharpening consumable cutting tool configuration of this invention, the tool itself is preferably in the shape of a flat plate (e.g., a prism or cylinder) of substantially uniform thickness with substantially parallel opposite major surfaces. This tool is placed upon a support block and clamped therewith in the tool holder with a portion of the tool overhanging the support block to provide the proper uniformly dimensioned ledge, or flange (i.e. the cutting element portion), to be consumed in the lengthwise direction thereof. The tool may be other than a flat plate provided the requisite cutting element configuration as described herein is forthcoming, when the tool is mounted and clamped in proper relation to an underlying support block. The flank dimension of this consumable portion is set by the thickness (in the range of 20 mils to 80 mils with a preferred range of 30 mils to 50 mils) of the tool and the depth of cut (i.e. locating the flank face in the range of 20 mils to 80 mils, with a preferred range of 30 mils to 50 mils, from the support) is set by the extent of overhang of the tool in the clamped position. Preferably, in addition to having a support block under the tool, there will also be a retainer/chip breaker plate located between the tool and the tool clamp. The tool, support block and chip breaker should each be made of refractory material, for example, cemented carbide.

The high-speed metal cutting method of this invention, likewise broadly and generally described, comprises the steps of providing a cutting tool of refractory material or other suitable composition, having as a cutting element thereof a ledge, or flange, of width equal to, or preferably slightly greater than, the depth of the intended cut and of maximum thickness corresponding to the ultimate flank wear size to be tolerated; then bringing the ledge of the tool against the workpiece so that it is disposed at an angle of about 1° to the plane of the finished cut surface, and then continuously advancing the tool lengthwise of the ledge in such contact with the workpiece either until the end of the intended cut or the end of the available cutting element. As has been mentioned hereinabove, both a roughing cut and subsequent finishing cut occur as the tool ledge is advanced lengthwise of itself. Further, in general, as indicated above, the machining operation of this invention may either be one involving turning or milling, the material removal or cutting action being the same in each instance because the cutting element (i.e., the consumable ledge or flange) of the cutting tool is involved in the same basic way and is usable without interruption as long as the cutting element lasts. Still further, while the new method of this invention can be carried out readily and with consistently good results through the use of the novel integrally formed tool construction of the first embodiment of this invention, this method is also useful to advantage with composite tools and tool arrangements comprising separate parts clamped together in the tool holder of a machine as in the second embodiment of this invention. The important features in each of these alternatives are (1) the provision of the overhanging cutting element of the tool proportioned as to width and depth according to the cut to be made and the flank wear dimension to be tolerated and (2) the movement of the tool relative to the workpiece as described hereinabove.

DETAILED DESCRIPTION OF THE INVENTION

Figure 1:
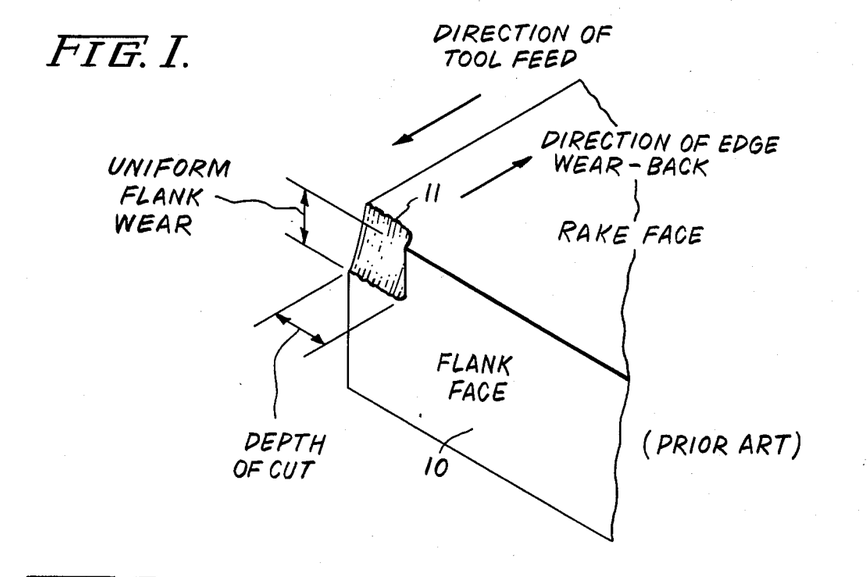
FIG. 1 is a fragmentary perspective view of a conventional cutting tool insert showing the small amount of tool wear at the end point of tool life.

As shown in FIG. 1, only a small portion of tool material is actually consumed at the end point of life of a tool insert of conventional geometry. In the machining operation tool insert 10 is affixed in a tool holder (not shown in FIG. 1) in an appropriate seat, or pocket, with its sides aligned with the tool holder (i.e. as contrasted to being in an overhanging position) and tool insert 10 is worn back only a relatively small amount at the point at which the size (i.e. the area) of flank wear or edge failure due to cratering wear stops effective cutting action. This effect is indicated at 11 in the drawing. At this stage of wear, the tool must either be reground or replaced. As shown, the vertical dimension labeled "uniform flank wear" representing tolerable flank wear is significantly smaller than the thickness of tool insert 10, which in commercial cemented carbide tooling is at least 125 mils. Otherwise, if when so worn the tool is forced against the workpiece, the thrust force rapidly increases due to the large size of the flank wear land and the dull corner in contact with the workpiece will damage the freshly cut surface of the workpiece. If the flank wear land is small but the wearback of the cutting edge (backward movement of the cutting edge from the original position) is the problem, the tool will cut again, if the edge is brought forward again. The limiting factor is, therefore, the size of the flank wear land, which is brought into contact with the newly cut surface of the workpiece when the edge is brought forward. As shown in FIG. 1, the cutting edge moves back along the direction of the cutting line.

We deduced from this behavior that in theory, if a thin cutting tool with thickness less than the maximum allowable length of flank wear is used and tool wearback is caused to progress along the length of the tool, cutting action of the tool is still maintained due to the limitation placed on the flank wear land area generated and the extent to which it makes contact with the newly cut surface of the workpiece. Generally, however, thin cutter plates do not have adequate strength to withstand usual cutting forces applied during machining.

Figures 2, 3:
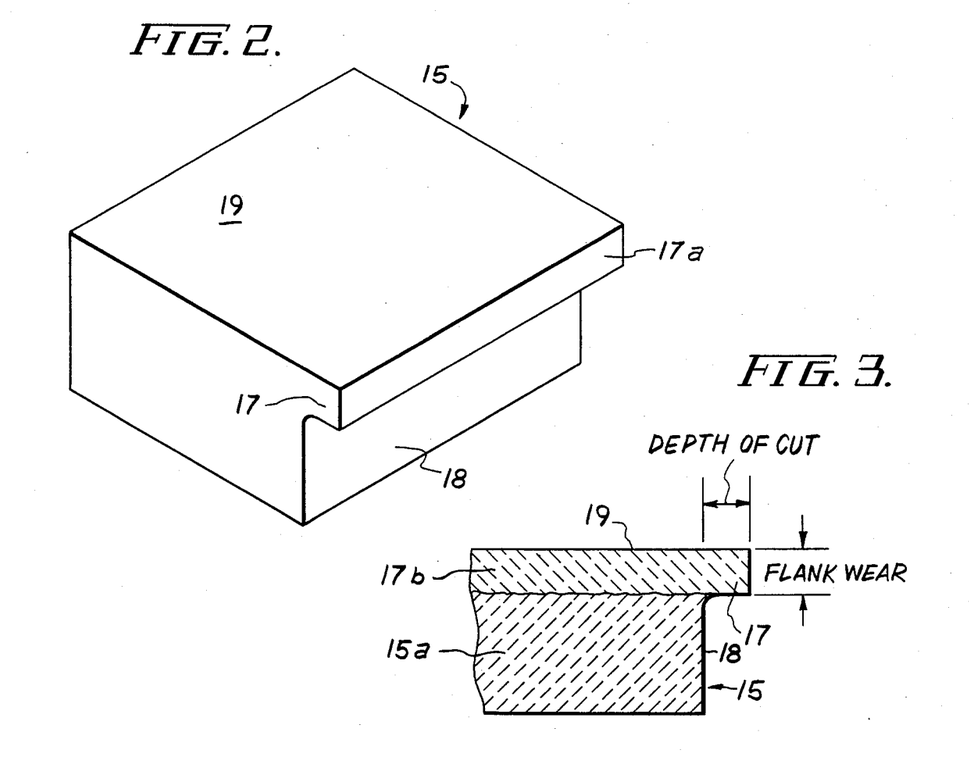
FIG. 2 is a view in perspective of a cutting tool construction of this invention.
FIG. 3 is a fragmentary cross-section through a tool having the outer configuration shown in FIG. 2 but in which different compositions and, thereby, different physical characteristics are provided in the support portion of the tool body and in the cutting element thereof.

Cutting tool configuration 15 (i.e. the integral construction) of this invention shown in FIG. 2 (and in FIG. 3 described in detail hereinafter) is in the general configuration of a hexahedron with a portion removed from a side to define an integrally-formed ledge 17 extending from a supporting face 18. Ledge 17 is in effect a flange, as it extends a uniform distance from face 18 and provides an upper edge of tool body 15. The upper surface of ledge 17, is, in effect, an extension of the top, or rake, face 19 of body 15, is coplanar therewith and presents or provides the flank face 17a (normal to the rake face, as shown). Flange 17 is of uniform cross-sectional size and shape throughout its length. Preferably flange 17 projects a distance amounting to one or two thousandths inch more than the depth of the cut to be made in machining use of the tool and is of a uniform thickness corresponding to the flank wear to be tolerated in the cutting operation.

The ability to introduce unique compositional and physical characteristics is indicated in FIG. 3 where flange 17 and the upper portion of tool body 15 are shown to be different from the major part of the tool mass. Thus, 17b can be made of 6% cobalt tungsten carbide while 15a can be made of the somewhat softer and less expensive iron-bonded tungsten carbide. As those skilled in the art will understand, however, the compositions actually employed may be varied depending upon the requirements of the uses to which these new tools are to be applied. Further by way of example, portion 17b may be made of cemented carbide impregnated with diamonds [according to the general teachings in the article "Diamond-Impregnated Carboloy" by G. F. Taylor (General Electric Review, Vol. 37, No. 2, page 97, Feb. 1934)] or may comprise a mixture of refractory materials. The cobalt content may vary from 3% to 24%, according to the hardness desired in the flange cutting element of these cobalt-bonded tools while the iron content of the iron-bonded bodies of these tools may suitably remain more or less constant without detriment to tool integrity.

Figure 4:
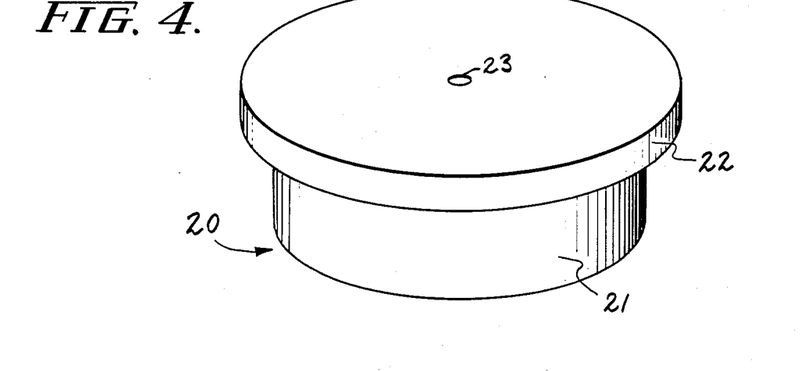
FIG. 4 is a view in perspective of another cutting tool of this invention of generally cylindrical instead of polyhedral form.

As shown in FIG. 4, integral tools of this invention can take cylindrical form, tool configuration 20 being formed as a body 21 having integral ledge, or flange 22, in the shape of an annulus extending around and projecting from the top edge of body 21 with its upper surface a coplanar extension of the top surface of the tool body. The width (i.e. amount of overhang) and depth of flange 22 are constant throughout its circumference so that as the tool is used and repositioned around a center pin in hole 23 for lengthwise ledge wear in the method of this invention, the same cut is taken and material is removed from the workpiece at a constant rate.

Figure 5:
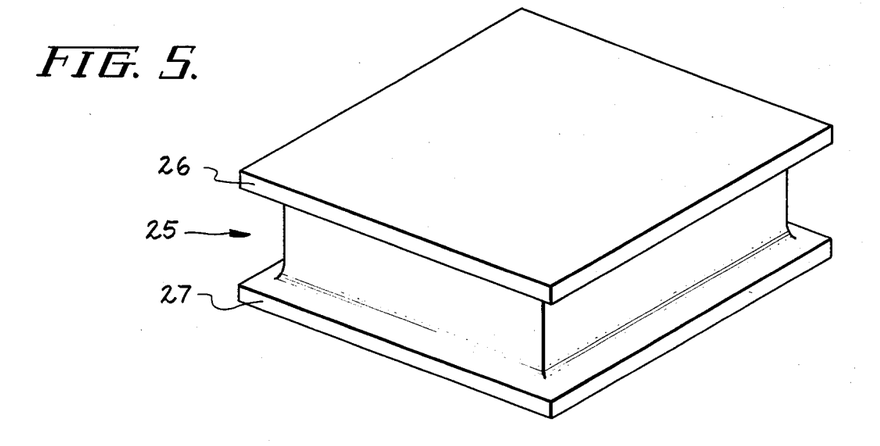
FIG. 5 is a view like that of FIG. 2 of another cutting tool construction embodying this invention in a preferred form having cutting element ledges or flanges extending from each of the four supporting faces at both top and the bottom of the tool.

Cutting tool 25 of FIG. 5 is like that of FIG. 2 in both general form and composition, but has top and bottom flanges 26 and 27 which extend around all four sides of the body. As in the FIG. 2 tool, however, flanges 26 and 27 are formed to the desired sizes of the cuts to be made in machining use of the tool and the tolerable flank wear. Accordingly, each flange segment, that is, each supporting face flange is of uniform size and shape over the full length of that supporting face but may differ in such respects from some or all the others to provide a versatile tool meeting a variety of different material removal requirements.

Figure 6:
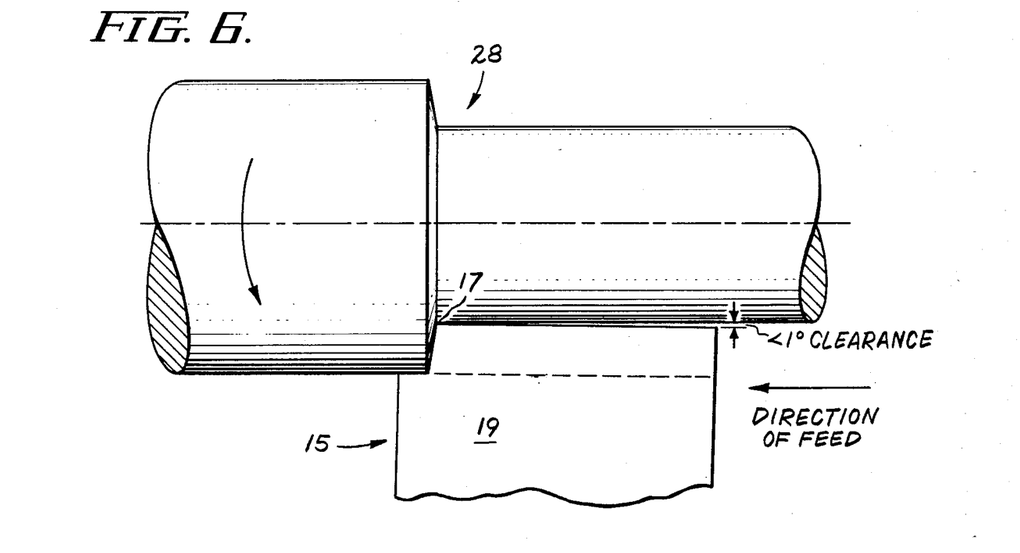
FIG. 6 is a plan view of a tool construction according to this invention in cutting engagement with a turning workpiece.

In using each embodiment of the tool configuration of this invention in machining (i.e. turning or milling) the tool is positioned in accordance with preferred practice of the method of this invention as illustrated in FIG. 6 with about 1° or less clearance between the cutting portion or flange of the tool and the plane of the cut to be made, or stated another way, with about a 1° or less clearance between the top front edge of cutting element 17 and the newly cut surface of the workpiece (i.e., the leading end of the cutting element is in contact with the workpiece and the trailing end of the cutting element is out of contact with the workpiece to provide the clearance angle). In this high-speed cutting operation (FIG. 6), tool 15 is advanced continuously in the direction shown with the constantly renewed leading end thereof in contact with a workpiece 28, which is in the form of a round bar or rod being rotated on its longitudinal axis relative to the tool to accomplish the desired cutting action. In this operation, flange 17 is more or less continuously worn away along its length as cutting proceeds so that as shown in FIG. 6, the flange disappears progressively until the cut is completed or until flange 17 is no longer available. Functionally, as the cutting proceeds, the length of the projecting flange executes a roughing cut and a continually advancing short length of the sharp top front edge of the flange (where contact is made with the workpiece at the apex of the 1° angle shown) executes a finishing cut immediately thereafter. Thus, quite unexpectedly this single tool does the jobs ordinarily requiring the use of two tools. If a multi-flange tool such as tool 25 is used, when one flange has been consumed, the tool may be remounted in a machine tool holder to bring the flange of another supporting face but of the same width and depth as flange 17 into contact with workpiece 28 to continue the material removal operation.

Figure 9:
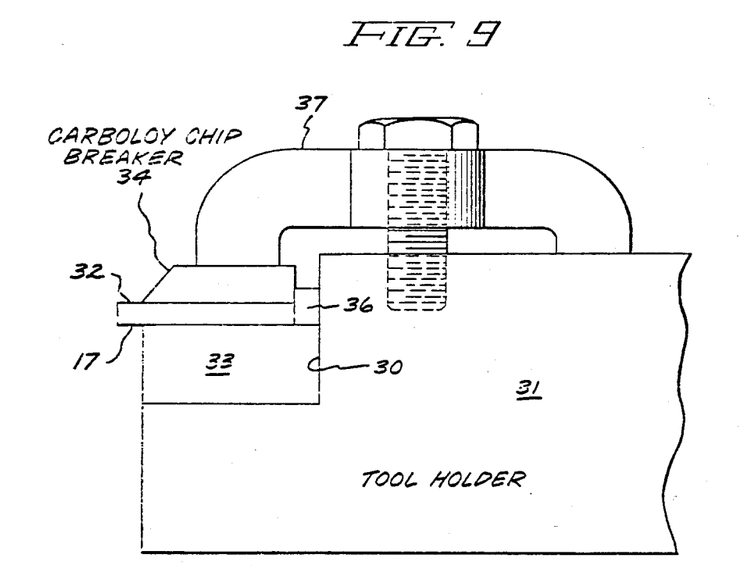
FIG. 9 is a side view in elevation of a thin flat plate of a refractory material, a supporting block of refractory material and a chip breaker, all of these elements being clamped together in a tool holder with a portion of the thin plate overhanging the supporting block to provide the consumable ledge.

Cutting tool configurations and arrangements for the second embodiment of the consumable tool of this invention are exemplified by the assembly shown in FIG. 9. Thus, pocket 30 of tool holder 31 receives the assembly of parts comprising thin flat plate 32 disposed between support block 33 and retainer/chip breaker plate 34. As is clearly shown, tool 32 projects beyond block 33 a uniform distance (i.e., 20-80 mils) to provide ledge, or flange, 17 comparable to flange 17 in the tool constructions shown in FIGS. 2 and 3, in view of the thickness (i.e., 20-80 mils) of tool 32. Shim 36 serves to set the amount of overhang, which in turn determines depth of cut. This assembly of parts is held in place by clamp 37. Back rake and side rake of the plate 32 (and thereby flange 17) are predetermined by the attitude of pocket 30 in the conventional manner.

In one machinability test using a tool arrangement such as is shown in FIG. 9, a flat plate of Carboloy® tungsten carbide Grade 883-SNG432 ½"×½"×40 mils thick was clamped in place with an overhang of 30 mils (depth of cut), a back rake angle of −5°, a side rake angle of −5° and clearance angle of 1° with the workpiece. The workpiece, a solid cylinder of 6-4 titanium (Rockwell C 34.6 hardness), was rotated at 600 surface feet per minute in a Lodge and Shipley (2013 model) lathe. The feed was 0.009 inch. This tool successfully machined for 30 seconds with a portion of the overhang being consumed. Machining was stopped when tool fracture occurred.

The tool was then rotated 90° to dispose a second edge in the same manner as the first edge and machining proceeded on the same workpiece under the same operating conditions. This tool was used for 1.5 minutes in successful machining it being noted that edge fracture had occurred. The remaining two sides were used in sequence in the same manner as with the previous sides. One of these sides was used for two cuts for a total machining time of 2.5 minutes; the second of these was also used to machine in two cuts each lasting 1.5 minutes. No ledge fracture occurred in the machining with either of the last two sides of the flat cemented carbide plate.

It will be understood from the foregoing description and from the drawings accompanying this specification, that the tool configurations and arrangements of this invention provide specific cutting portions which are consumed during the cutting action, while the tool retains the requisite strength for carrying out the cutting action and withstanding the forces applied in machining use of the tool. The tool can be of any shape to provide the principal new results and advantages of this invention, the flange or ledge feature being the important element whether or not the flange be integrally-formed as part of an underlying support.

Those skilled in the art will gain a further and better understanding of this invention from the following additional illustrative, but not limiting, examples of the practice of the invention as we have actually carried it out in the course of producing integrally-formed tools of this invention and using them in machining operations in circumstances in which they were compared with conventional tools of the prior art.

EXAMPLE I

One side of a standard, commercially available, cemented carbide tool insert ½"×½"×3/16" (94% tungsten carbide containing six percent cobalt) known on the market as Grade 883-SNG 434 was ground to provide a ledge or flange 0.030 inch by 0.030 inch so that it had the configuration of tool 15 of FIG. 2. This tool was employed in the machining of heat-treated 6-4 titanium alloy bar (Rockwell C 35 hardness) being disposed in relation to the bar in the manner illustrated in FIG. 6. The cutting conditions were minus 5° back rake angle, minus 5° side rake angle and smaller than 1° side-cutting edge angle. The depth of cut was 0.030 inch while the feed was 0.009 inch per revolution and the cutting speed was 600 surface feet per minute. Cutting was continued for eight minutes and then stopped because the full length of the bar had been machined. The cutting tool at this point, however, had not been completely consumed and was still cutting as effectively as ever. The cut finish on the workpiece on examination proved to be excellent. While the tool cutting flange exhibited a rough appearance at the edge, the surface of the workpiece where last touched by the flange (i.e., the freshly sharpened front corner of the cutting flange) received an excellent finish.

By comparison, a tool of the same composition but of conventional design (½"×½"×3/16") used in a similar machining operation carried on in the conventional manner resulted in 0.070 inch flank wear after only 30 seconds of machining. At this point the tool was no longer useful.

EXAMPLE II

Using a tool like that of FIG. 2 and Example I (i.e. formed from a standard ½"×½"×3/16" tool insert), but with a ledge or flange 0.050 inch by 0.050 inch in a machining operation the same as that of Example I, except that the depth of the cut was 0.050 inch, the cutting edge after four minutes fifteen seconds was performing quite effectively and the finish on the workpiece was found to be excellent.

EXAMPLE III

In another experiment like that of Example I, a tool the same as that used in Example I was used on another heattreated 6-4 titanium alloy bar. The cutting speed, however, was 1100 surface feet per minute. The results were as described in Example I. Thus, the tool of this invention proved to be useful continuously throughout the length of the cut and to provide a uniformly excellent workpiece finished cut surface.

EXAMPLE IV

The tools of this invention were evaluated in still another experiment involving face milling of forged 6-2-4-2 titanium alloy blocks. Two milling cutters, Futurmil Model ZN15L-0808 (8 inch diameter head with 8 slots for replaceable inserts with 15° side cutting edge angle) and Model ZN15L-0306 (3 inch diameter head with 6 slots for replaceable inserts with 15° side cutting edge angle) were used for the milling experiments. Three types of Carboloy grade 883 blank, SNG 434 (3/16 inch thick and ½ inch square), SNG 533 (3/16 inch thick and ⅝ inch square), and SNG 633 (3/16 inch thick and ¾ inch square) were used as the base material for the tools of this invention. Since both milling cutters have 15° side cutting edge angle pockets, a 14° wedge shaped portion was removed from each of two adjoining sides of the square blanks by grinding such that when the remaining original square corner was set in the pockets of the milling cutters, the newly ground side adjacent the workpiece would have a one degree clearance angle with the finished workpiece surface. A 0.030 inch deep and 0.040 inch thick ledge was ground on the newly ground side of the blank with the preset clearance.

The depth of cut in all the experiments was 0.030 inch and the feed was 0.0034 inch per tooth. The ledges did not break in any of these milling cuts except in the case of one very high speed trial (1320 feet per minute). At speeds over 1000 feet per minute, edges became too hot and the ledge broke occasionally. Because of the unique design of these tools, however, breakage was confined to the ledge part of the tool and was consequently not detrimental to the workpiece.

On a microscopic level, the mode of wear of tools of this invention proved to be the same in both turning and milling, as inspection of the worn edges of the tools used in all the machinability tests established.

Figure 7:
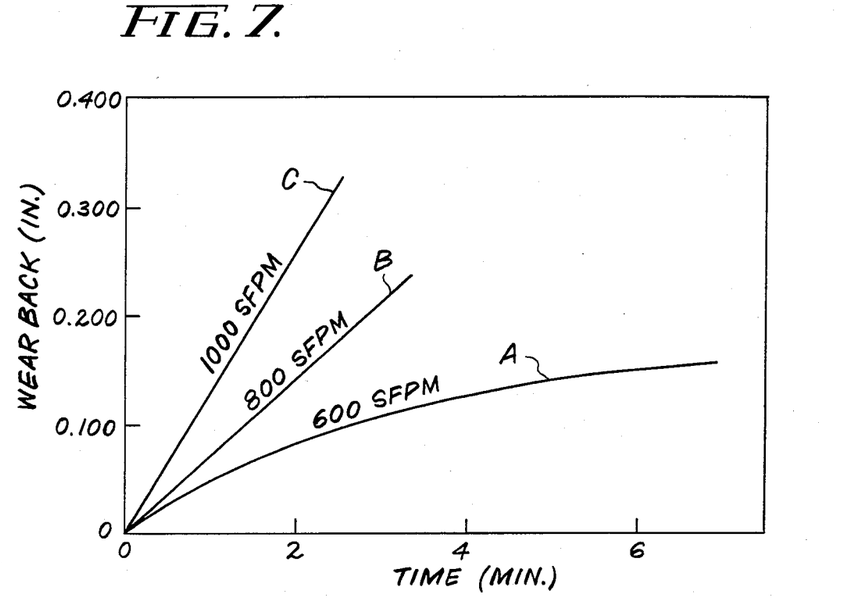
FIG. 7 is a chart on which tool wear in inches is plotted against tool use time in minutes for cutting operations according to the method of this invention carried out at two different depths of cut and three different rates.
Figure 8:
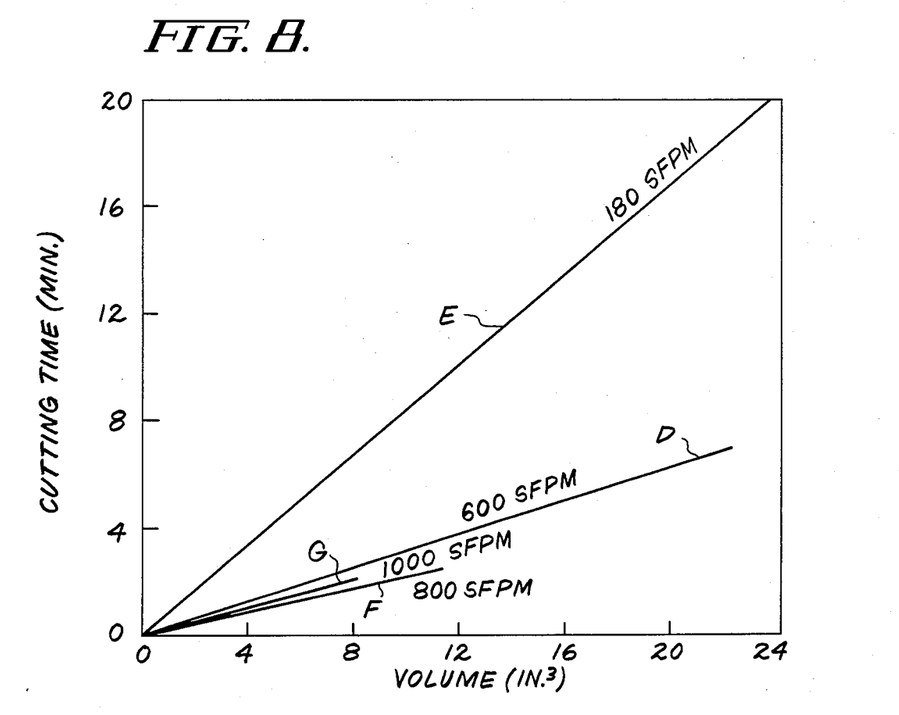
FIG. 8 is another chart on which cutting time in minutes is plotted against material removed in cubic inches at four different cutting speeds in machining operations involving a conventional tool in one instance and tools of this invention in the others.

The charts of FIGS. 7 and 8 illustrate the results developed in the course of the foregoing experiments and in other experimental work carried out in the course of evaluating and testing the new tools of this invention and the new high-speed metal cutting process of this invention. Thus, in respect to FIG. 7, it is seen that wearback of the cutting edge of these novel tools in the new method of this invention for various speeds is a very strong function of the actual cutting speed, Curves A, B and C representing, respectively, experimental data developed at 600, 800 and 1000 surface feet per minute. The tools used in these experiments were as described in Example I while the depth of cut was 0.050 inch (except in the most rapid cut which was 0.030 inch deep), and the feed and back rake, side-cutting edge and side rake angles were those of Example I. Similarly, it is seen in FIG. 8 that the relationship between machining time and volume of material removed varies substantially between the situation where a tool of this invention is used and where a conventional tool of the prior art is employed. The machining time using a tool of this invention is shown by Curve D to be only about one-third that for a conventional tool represented by Curve E. Further, the tool of Curve E had reached the end of its useful life while that of Curve D was only at about one-third of its projected useful life.

Curves F and G represent data developed in additional experiments along the lines of those of Curves D and E but at cutting speeds of 800 and 1000 surface feet per minute, respectively. Thus, Curves D, F and G all represent results of using tools of this invention in practice of the method of this invention on 6-4 titanium alloy (heat-treated) cut depth being 0.050 inch, feed rate being 0.009 inch per minutes and back rake and side rake angles each being minus 5° in all three cases, as in the experiments of FIG. 7.

It will be understood from the foregoing that if the machine employed has adequate stiffness, a cutting element ledge or flange of a tool of this invention can be considerably thicker than the normal end point of flank wear. In this cutting geometry, the wear land does not touch the finished surface but only rubs the portion of the workpiece to be removed making rough and then finish cuts in sequence. Thus, in contrast to conventional tool inserts, increasing the ledge thickness will probably increase the feed and thrust forces without any significantly deleterious consequence to the workpiece surface integrity. However, in any such use, contact of the ledge tip alone with the workpiece without having the transverse dimension of the flange buried in the workpiece as shown in FIG. 6 should be avoided since the important aspect of having the wearback occur lengthwise of the flange would be missing from the machining operation. Further, it should be recognized that optional usage of the novel tool configurations and arrangements of this invention presupposes unyielding affixation of the cutting element in its proper orientation relative to the workpiece.

What we claim as new and desire to secure by Letters Patent of the United States is:

1. The high-speed, metal cutting method which comprises the steps of:
    (a) providing and rigidly mounting a cutting tool adjacent a metal workpiece, said cutting tool having as part thereof a cantilevered longitudinally-extending cutting element at least ¼ inch in length, having a thickness dimension in the range of from 20 mils to 80 mils, being substantially uniform in transverse cross-section along its length and having a flank face and a rake face with said flank face being a substantially uniform distance in the range of from 20 mils to 80 mils from any support for said cutting element;

(b) causing relative rotation to occur between said cutting element and said workpiece;

(c) bringing the leading end of said cutting element against said workpiece;

(d) providing a clearance angle of about one degree or less between said flank face and said workpiece thereby having the trailing end of said cutting element out of contact with said workpiece and (e) advancing said tool and maintaining contact between the leading end of said cutting element and said workpiece as metal is removed from said workpiece during the relative rotation and said cutting element is consumed along the length thereof with a new leading end being generated as wear occurs.

2. The method of claim 1 in which the cutting element is composed of cemented carbide and the workpiece is a titanium alloy body.

3. The method of claim 2 in which the cutting element is of tungsten carbide containing about six percent cobalt and in which the cutting element is maintained in contact with the workpiece during the consumption of most of the length of the cutting element at cutting speeds in excess of about 180 feet per minute.

4. The method of claim 1 in which the cutting operation is a face milling cut and in which the workpiece is a titanium alloy block.

5. The method of claim 1 in which the cutting operation is a turning cut and in which the workpiece is a titanium alloy bar.

6. The method of claim 1 in which the cutting element produces in sequence a roughing cut and a finishing cut over the same workpiece area as consumption of said cutting element along the length thereof provides the self-sharpening action.

7. The method of claim 1 wherein the cutting tool is in the form of a tool insert comprising in combination a longitudinally-extending cutting element and means for supporting said cutting element formed integrally therewith and the flank face is defined at its upper extremity by a sharp edge, whereby during use as tool wear occurs consuming said cutting element along its length new edges are generated, new short lengths of said sharp edge are exposed and a new edge together with a newly exposed short length become the leading end of said cutting element.

8. The method of claim 7 wherein the support means has planar sides and the cutting element is in the form of a ledge of generally rectangular transverse cross-section extending along the full length of at least one of said sides.

9. The method of claim 8 wherein the tool insert is in the general shape of a hexahedron and the ledge extends along an upper edge thereof.

10. The method of claim 7 wherein the cutting element is composed of refractory material.

11. The method of claim 10 wherein the cutting element is composed of cobalt-bonded tungsten carbide and the support means is composed of iron-bonded tungsten carbide.

12. The method of claim 10 wherein the cutting element is composed of more than one refractory material.

13. The method of claim 7 wherein the distance of the flank face from the support means is from about 30 mils to about 50 mils and the maximum thickness of the cutting element is from about 30 mils to about 50 mils.

14. The method of claim 1 wherein the cutting tool is in the form of a tool insert of refractory material in combination with a separate support therefor, said tool insert being a flat plate of substantially uniform thickness in the range of from 20 mils to 80 mils disposed on said support in overhanging relationship therewith to define the cutting element and the flank face provided thereby is defined at its upper extremity by a sharp edge, whereby during use as tool wear occurs consuming said cutting element along its length new edges are generated, new short lengths of said sharp edge are exposed and a new edge together with a newly exposed short length become the leading end of said cutting element.

15. The method of claim 14 wherein the cutting element is composed of refractory material.

16. The method of claim 15 wherein the cutting element is composed of cobalt-bonded tungsten carbide and the separate support is composed of iron-bonded tungsten carbide.

17. The method of claim 14 wherein the distance of the flank face from the separate support is from about 30 mils to about 50 mils and the maximum thickness of the cutting element is from about 30 mils to about 50 mils.

18. The method of claim 15 wherein the cutting element is composed of more than one refractory material.

19. In a cutting tool arrangement in which a tool insert of refractory material is rigidly held in a tool holder, said tool holder being adapted to bring said tool insert into contact with a metal workpiece to alter the shape thereof by the removal of metal therefrom, the improvement wherein the tool insert is a flat plate of substantially uniform thickness in the range of from 20 mils to 80 mils, said plate being fixedly disposed on a separate support therefor in overhanging relationship therewith to define a cutting element portion of said plate having a flank face of said cutting element portion located a substantially uniform thickness in the range of from 20 mils to 80 mils from said support, said flank face being defined at its upper extremity by a sharp edge, said cutting element portion being at least ¼ inch in length with the thickness of said cutting element being in the range of from 20 mils to 80 mils whereby during use as tool wear occurs consuming said cutting element along its length, new edges are generated on said cutting element at the leading end thereof where the cutting element consumption occurs and new short lengths of said sharp edge are exposed, a new edge together with a newly exposed short length become the leading end of said cutting element.

20. The improvement recited in claim 19 wherein the plate is in the shape of a prism and the support therefor is a block of refractory material.

21. The improvement recited in claim 20 wherein the plate and block are each in the shape of a hexahedron.

22. The improvement recited in claim 20 wherein the plate is indexable to provide sequential cutting element portions.

23. The improvement recited in claim 19 wherein the substantially uniform thickness of the plate is in the range of from about 30 mils to about 50 mils.

24. The improvement recited in claim 19 wherein the plate is composed of cobalt-bonded tungsten carbide.

25. The improvement recited in claim 24 wherein the support is made of cobalt-bonded tungsten carbide.

26. The improvement recited in claim 24 wherein the support is made of iron-bonded tungsten carbide.

27. In a cutting tool arrangement in which a tool insert of refractory material is rigidly held in a tool holder, said tool holder being adapted to bring said tool insert into contact with a metal workpiece to alter the shape thereof by the removal of metal therefrom, the improvement wherein the tool insert is a multi-sided body having as at least one side thereof a longitudinally-extending portion of substantially uniform thickness in the range of from 20 mils to 80 mils, said tool insert being fixedly disposed in the tool holder on a separate support therefor with said portion in overhanging relationship with said support to define a cutting element having the flank face thereof located at a substantially uniform distance in the range of from 20 mils to 80 mils from said support, said flank face being defined at its upper extremity by a sharp edge, said cutting element being at least ¼ inch in length and of substantially uniform transverse cross-section along said length with the maximum thickness of said cutting element being in the range of from 20 mils to 80 mils whereby during use as tool wear occurs consuming said cutting element along its length, new edges are generated on said cutting element at the leading end thereof where the cutting element consumption occurs and new short lengths of said sharp edge are exposed, a new edge together with a newly exposed short length become the leading end of said cutting element.

28. The improvement recited in claim 27 wherein the multi-sided body has at least one flat major surface.

29. The improvement recited in claim 27 wherein the substantially uniform thickness of the cutting element is in the range of about 30 mils to 50 mils.

30. The improvement recited in claim 27 wherein the multi-sided body has the longitudinally-extending portion as described along each side thereof.

31. A cutting tool insert of refractory material comprising in combination a longitudinally-extending cutting element presenting the flank face for said tool insert and means for supporting said cutting element formed integrally therewith, said cutting element being in overhanging relationship to said support means with said flank face located a substantially uniform distance in the range of from 20 mils to 80 mils from said support means, said flank face being defined at its upper extremity by a sharp edge, said cutting element being at least ¼ inch in length and of substantially uniform transverse cross-section along said length with a thickness dimension in the range of from 20 mils to 80 mils, said support means being in the shape of a right circular cylinder and said cutting element being in the form of a ledge of generally rectangular transverse cross-section extending along the upper edge of said support means, whereby as tool wear occurs during use said cutting element is consumed along its length generating new edges where the cutting element consumption occurs and exposing new short lengths of said sharp edge adjacent thereto.

* * * * *